(12) United States Patent
Crookes et al.

(10) Patent No.: US 8,599,591 B2
(45) Date of Patent: Dec. 3, 2013

(54) CONVERTER

(75) Inventors: William Crookes, Salt (GB); David Trainer, Alvaston (GB); Colin Oates, Brocton (GB)

(73) Assignee: Alstom Technology Ltd, Baden (CH)

( * ) Notice: Subject to any disclaimer, the term of this patent is extended or adjusted under 35 U.S.C. 154(b) by 85 days.

(21) Appl. No.: 13/380,500

(22) PCT Filed: Jun. 22, 2009

(86) PCT No.: PCT/EP2009/057736
§ 371 (c)(1),
(2), (4) Date: Jan. 18, 2012

(87) PCT Pub. No.: WO2010/149200
PCT Pub. Date: Dec. 29, 2010

(65) Prior Publication Data
US 2012/0113699 A1    May 10, 2012

(51) Int. Cl.
*H02M 7/217* (2006.01)
*G05F 1/70* (2006.01)

(52) U.S. Cl.
USPC ........................................ 363/127; 323/207

(58) Field of Classification Search
USPC .......... 363/123, 124, 125, 126, 127; 323/205, 323/207
See application file for complete search history.

(56) References Cited

U.S. PATENT DOCUMENTS

| | | | |
|---|---|---|---|
| 3,867,643 A | 2/1975 | Baker | |
| 5,532,575 A | 7/1996 | Ainsworth | |
| 6,879,062 B2 | 4/2005 | Oates | |
| 2005/0127853 A1 | 6/2005 | Su | |
| 2011/0205768 A1* | 8/2011 | Svensson | 363/49 |
| 2012/0069610 A1* | 3/2012 | Trainer et al. | 363/35 |
| 2012/0127766 A1* | 5/2012 | Crookes et al. | 363/126 |
| 2012/0170338 A1* | 7/2012 | Trainer et al. | 363/127 |
| 2012/0182771 A1* | 7/2012 | Trainer et al. | 363/51 |

(Continued)

FOREIGN PATENT DOCUMENTS

| | | |
|---|---|---|
| DE | 195 35 552 A1 | 4/1996 |
| DE | 10103031 A1 | 7/2002 |

(Continued)

OTHER PUBLICATIONS

International Search Report and Written Opinion in International Application No. PCT/EP2009/057736, mailed Mar. 26, 2010.

(Continued)

*Primary Examiner* — Adolf Berhane
(74) *Attorney, Agent, or Firm* — Nixon Peabody LLP

(57) ABSTRACT

A voltage source converter for use in high voltage DC power transmission and reactive power compensation. The voltage source converter comprises at least one converter limb including first and second DC terminals for connection in use to a DC network and an AC terminal for connection in use to an AC network.

The or each converter limb defines first and second limb portions, each limb portion including at least one switching element connected in series with a chain-link converter between a respective one of the first and second DC terminals and the AC terminal. The switching elements of the first and second limb portions is operable to switch the respective chain-link converters in and out of circuit between the respective DC terminal and the AC terminal. The chain-link converters are operable to generate a voltage waveform at the AC terminal.

13 Claims, 7 Drawing Sheets

(56) References Cited

U.S. PATENT DOCUMENTS

| | | | |
|---|---|---|---|
| 2012/0188803 A1* | 7/2012 | Trainer et al. | 363/37 |
| 2013/0026841 A1* | 1/2013 | Hosini et al. | 307/77 |
| 2013/0094264 A1* | 4/2013 | Crookes et al. | 363/127 |
| 2013/0119970 A1* | 5/2013 | Trainer et al. | 323/364 |
| 2013/0128629 A1* | 5/2013 | Clare et al. | 363/35 |
| 2013/0128636 A1* | 5/2013 | Trainer et al. | 363/65 |

FOREIGN PATENT DOCUMENTS

| | | |
|---|---|---|
| EP | 1 800 391 A2 | 6/2007 |
| GB | 2294821 A | 5/1996 |
| GB | 2 418 079 A | 3/2006 |
| WO | 02/063758 A1 | 8/2002 |
| WO | 2007/028349 A1 | 3/2007 |
| WO | 2007028350 A1 | 3/2007 |
| WO | 2008/086760 A1 | 7/2008 |
| WO | 2010/025758 A1 | 3/2010 |
| WO | 2010/145688 A1 | 12/2010 |
| WO | 2010/145690 A1 | 12/2010 |
| WO | 2010/149200 A1 | 12/2010 |
| WO | 2011/012171 A1 | 2/2011 |
| WO | 2011/012174 A1 | 2/2011 |
| WO | 2011/050847 A1 | 5/2011 |
| WO | 2011/098117 A1 | 8/2011 |
| WO | 2011/113471 A1 | 9/2011 |
| WO | 2011/124258 A1 | 10/2011 |

OTHER PUBLICATIONS

International Preliminary Report on Patentability in International Application No. PCT/EP2009/057736, mailed Nov. 24, 2011.

Allebrod, S. et al., "New Transformerless, Scalable Modular Multilevel Converters for HVDC—Transmission", Power Electronics Specialists Conference, IEEE, Jun. 15, 2007, pp. 174-179.

Hagiwara, Makoto et al., "PWM Control and Experiment of Modular Multilevel Converters", Power Electronics Specialists Conference, PESC 2008, IEEE, Piscataway, NJ, USA, pp. 154-161, (2008).

Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.

Glinka M., "Prototype of Multiphase Modular-Multilevel-Converter with 2MW Power Rating and 17-Level-OutputVoltage", 2004 35th Annual IEEE Power Electronics Specialists Conference, Jun. 20-25, 2004, pp. 2572-2576.

Lesnicar, A. et al., "A New Modular Voltage Source Inverter Topology", pp. 1-10, (2003), XP002454302.

Lesnicar, A. et al., "An Innovative Modular Multilevel Converter Topology Suitable for a Wide Power Range", 2003 IEEE Bologna PowerTech Conference, Jun. 23-26, 2003, pp. 1-6.

Raju, N. Ravisekhar, "A DC Link-Modulated Three-Phase Converter", IEEE, pp. 2181-2185, (2001), XP010561989.

PCT International Search Report and Written Opinion in International Application No. PCT/EP2010/053290, mailed on Feb. 11, 2011.

PCT International Search Report and Written Opinion in International Application No. PCT/EP2010/051572, mailed on Jan. 19, 2011.

PCT International Search Report and Written Opinion in International Application No. PCT/EP2009/057388, mailed on Mar. 18, 2010.

PCT International Search Report and Written Opinion in International Application No. PCT/EP2009/059973, mailed on Aug. 13, 2010.

PCT International Search Report and Written Opinion for Application No. PCT/EP2010/061145, mailed on Jun. 5, 2011.

U.S. Appl. No. 13/576,920.

U.S. Appl. No. 13/639,844.

U.S. Appl. No. 13/805,333.

\* cited by examiner

CONVERTER

CROSS-REFERENCE TO RELATED PATENT APPLICATION

The present application is a National Stage Application of International Application No. PCT/EP2009/057736 entitled "Converter" filed Jun. 22, 2009, the contents of which are incorporated herein by reference in its entirety.

The invention relates to a voltage source converter for use in high voltage direct current (HVDC) power transmission and reactive power compensation.

In HVDC power transmission, alternating current (AC) electrical power is converted to high voltage direct current (DC) power for transmission via overhead lines and/or undersea cables. This conversion reduces the cost per kilometer of the lines and/or cables, and is therefore cost-effective when power needs to be transmitted over a long distance. Once the transmitted electrical power reaches its target destination, the high voltage DC electrical power is converted back to AC electrical power before being distributed to local networks.

The conversion of AC power to DC power is also commonly utilized in power transmission networks in circumstances where it is necessary to interconnect two AC networks operating at different frequencies.

Converters are required at each interface between AC and DC networks to effect the required conversion between AC power and DC power, and one such form of converter is a voltage source converter (VSC).

One form of known voltage source converter is shown in FIG. 1a and includes six sets of series connected insulated gate bipolar transistors (IGBTs) 24 and anti-parallel diodes. The IGBTs 24 are connected and switched together in series to enable high power ratings of 10's to 100's of MW to be realized.

This approach however required a complex and active IGBT drive, and requires large passive snubber components to ensure that the high voltage across the series strings of IGBTs 24 shares properly during converter switching. In addition the IGBTs 24 need to switch on and off several times at high voltage over each cycle of the AC supply frequency to control the harmonic currents being fed to the AC network 20. These factors lead to high losses, high levels of electromagnetic interference and a complex design.

Another known voltage source converter is shown in FIG. 1b and includes a multilevel converter arrangement. The multilevel converter arrangement includes converter bridges or cells 26 connected in series, each converter cell 26 including a pair of series connected IGBTs 27 connected in parallel with a capacitor 28. Each converter cell 26 is switched at a different time and such an arrangement eliminates the problems associated with the direct switching of series connected IGBTs because the individual converter cells 26 do not switch simultaneously and converter steps are comparatively small.

The capacitor 28 of each converter cell 26 must however have a high capacitive value to constrain the voltage variation at the capacitor terminals in the multilevel converter arrangement. Six DC side reactors 30 are also required to enable the parallel connection and operation of the converter limbs, and are primarily used to limit transient current flow between converter limbs.

These factors lead to expensive, large and heavy equipment with significant amounts of stored energy, making pre-assembly, testing and transportation of the equipment difficult.

According to an aspect of the invention there is provided a voltage source converter for use in high voltage DC power transmission and reactive power compensation, the voltage source converter comprising at least one converter limb including first and second DC terminals for connection in use to a DC network and an AC terminal for connection in use to an AC network, the or each converter limb defining first and second limb portions, each limb portion including at least one switching element connected in series with a chain-link converter between a respective one of the first and second DC terminals and the AC terminal, the switching elements of the first and second limb portions being operable to switch the respective chain-link converters in and out of circuit between the respective DC terminal and the AC terminal and the chain-link converters being operable to generate a voltage waveform at the AC terminal.

The series combination of one or more switching elements connected in series with a chain-link converter in each limb portion to switch the limb portion in and out of circuit between the respective DC terminal and the AC terminal is advantageous because it reduces the voltage range that each chain-link converter would be required to generate. This in turn allows the number of components in each chain-link converter to be minimized.

Each chain-link converter is preferably operable when the respective limb portion is switched out of circuit to generate a voltage to offset the voltage across the limb portion and thereby minimize the voltage across the respective switching element.

This feature is advantageous in that it allows the voltage source converter to operate at voltage levels that are greater than the voltage rating of the switching element. This allows the construction of a voltage source converter having an operating range that is independent of the voltage ratings of available switching elements. It therefore allows the construction of a voltage source converter having a greater operating range than would otherwise be possible and also allows the use of switching elements with relatively low voltage ratings.

Reducing the voltage across the switching element of each limb portion when the limb portion is switched out of circuit is also beneficial in that it minimizes the switching losses when the respective switching element toggles between open and closed positions.

Preferably the chain-link converter of each of the limb portions includes a chain of modules connected in series, each module including at least one pair of secondary switching elements connected in parallel with an energy storage device, the secondary switching elements being operable in use so that the chain of modules defines a stepped variable voltage source.

The use of a chain of modules connected in series allows each of the chain-link converters to provide a voltage that may be increased in incremental steps by the insertion of additional modules into the chain so as to provide a voltage that is higher than the voltage provided by each individual module. This arrangement therefore allows the voltage provided by the chain-link converter of each limb portion to be varied so as to allow the generation of a voltage waveform at the AC terminal.

In the event of a fault in an electrical network connected to the voltage source converter, resulting in a high fault current in the voltage source converter, the secondary switching elements of the modules in the chain-link converter may be operated to insert modules into the chain so as to provide a voltage that opposes the driving voltage of the other non-faulty electrical network and thereby reduces the fault current in the voltage source converter.

In embodiments of the invention, the or each module of the chain-link converters may include two pairs of secondary switching elements connected in parallel with the respective energy storage device in a full-bridge arrangement to define a 4-quadrant bipolar module that can provide positive or negative voltage and can conduct current in both directions.

The ability of a 4-quadrant bipolar module to provide positive or negative voltages means that the voltage across each chain-link converter may be built up from a combination of modules providing positive or negative voltages. The energy levels in the individual energy storage devices may be maintained therefore at optimal levels by controlling the modules to alternate between providing positive or negative voltage.

The use of full-bridge modules in the chain-link converter of each limb portion also enables the chain-link converter to provide an output voltage at the AC terminal that exceeds the DC voltage of the DC network connected to the first and second DC terminals.

The or each energy storage device may be any device that is capable of storing and releasing its electrical energy to provide a voltage and may therefore include a capacitor, a fuel cell, a battery or an auxiliary AC generator with an associated rectifier.

Such flexibility is useful in the design of converter stations in different locations where the availability of equipment may vary due to locality of transport difficulties. For example, the energy storage device of each module on offshore wind farms may be an auxiliary AC generator connected to the wind turbine.

The or each switching element of each limb portion preferably includes a semiconductor device, and may include an insulated gate bipolar transistor, a gate turn-off thyristor or an integrated gate-commutated thyristor.

Each chain-link converter also preferably includes at least one semiconductor device, and may include an insulated gate bipolar transistor, a gate turn-off thyristor or an integrated gate-commutated thyristor.

The use of semiconductor devices is advantageous because such devices are small in size and weight and have relatively low power dissipation, which minimizes the need for cooling equipment. It therefore leads to significant reductions in power converter cost, size and weight.

In embodiments of the invention the voltage source converter may include multiple converter limbs, each limb including an AC terminal for connection to a respective phase of a multi-phase AC network.

In such a voltage source converter, the series connection of the switching elements and chain-link converters of each converter limb operates independently of that of the other converter limbs and therefore only affects the phase connected to the respective AC terminal, and has no influence on the phases connected to the AC terminals of the other converter limbs.

Preferably the chain-link converter of each limb portion is operable to generate a voltage to oppose the flow of current created by a fault, in use, in the AC or DC networks.

The voltage rating of the chain-link converter and the voltage rating of the or each switching element, in each limb, may be equal. In other embodiments however the voltage rating of the chain-link converter and the voltage rating of the or each switching element, in each limb, may not be equal so as to optimise the converter cost, size, weight, efficiency and/or performance.

The switching elements in the first and second limb portions are preferably operable to switch the chain-link converters into circuit at the same time to reset any drift in voltages in the chain-link converter elements.

Preferred embodiments of the invention will now be described, by way of non-limiting examples, with reference to the accompanying drawings in which.

Figure 1A:
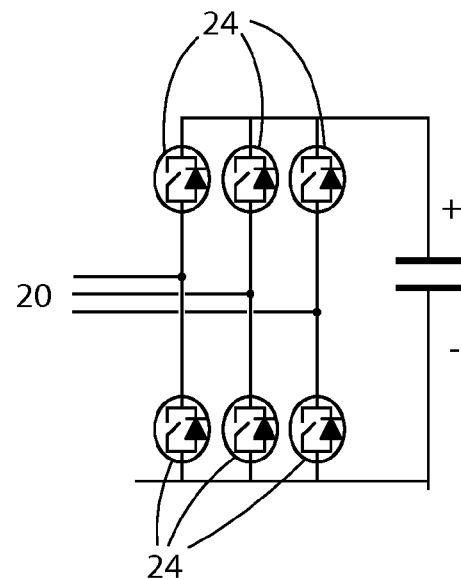
FIGS. 1a and 1b show, in schematic form, prior art voltage source converters for HVDC power transmission.
Figure 1B:
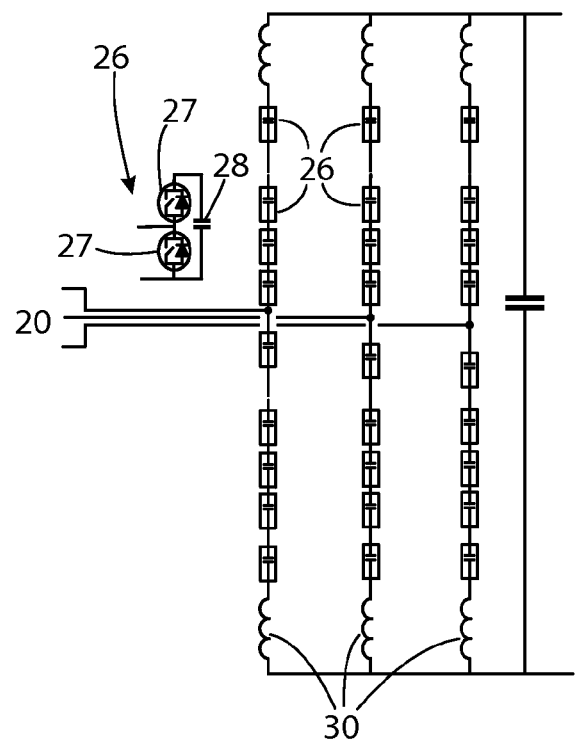
Figure 2:
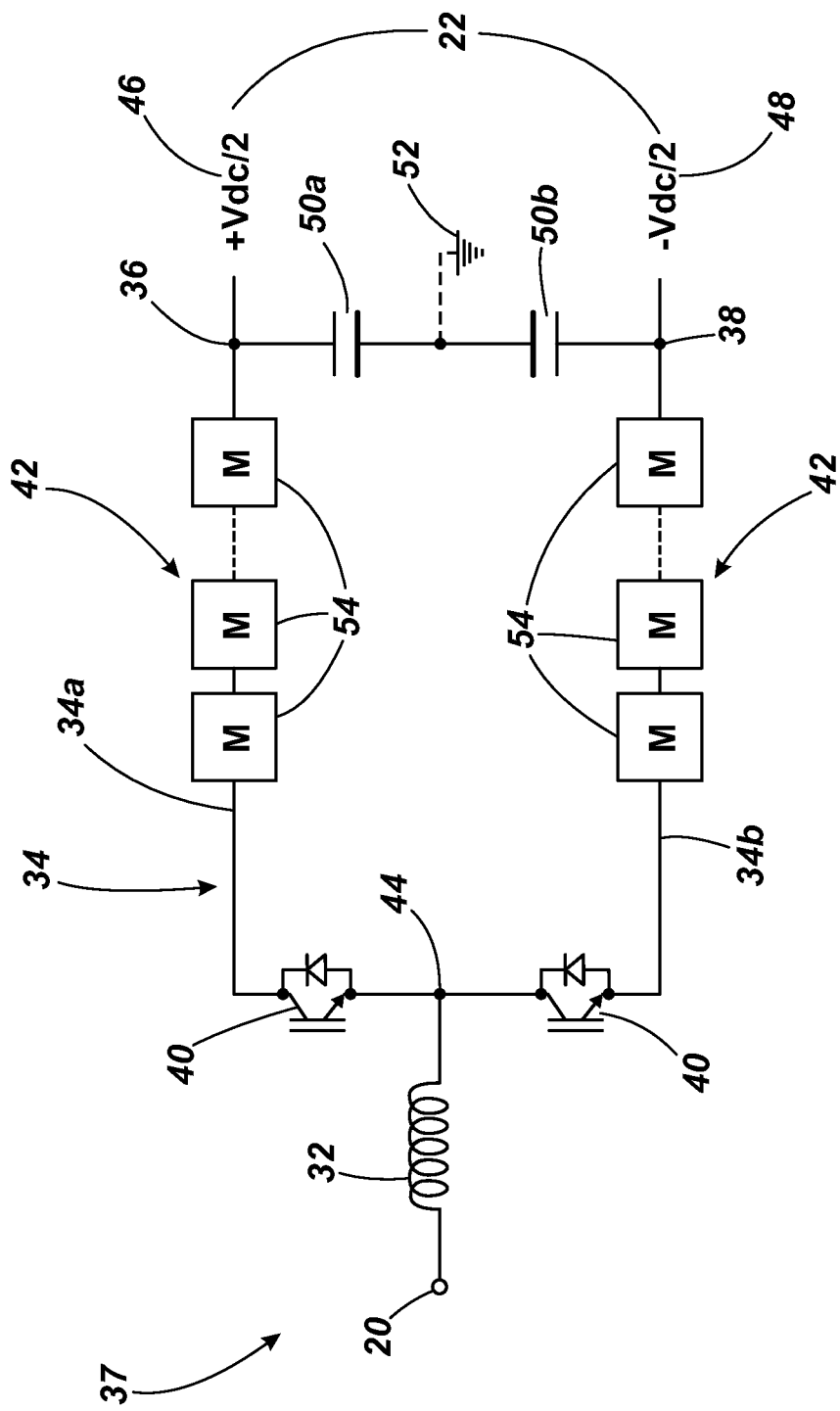
FIG. 2 shows a voltage source converter according to a first embodiment of the invention.

A voltage source converter 37 according to an embodiment of the invention is shown in FIG. 2.

The voltage source converter 37 includes a converter limb 34 having first and second DC terminals 36,38 and an AC terminal 44. The converter limb 34 defines first and second limb portions 34a,34b, each limb portion including a switching element 40 connected in series with a chain-link converter 42 between a respective one of the first and second DC terminals 36,38 and the AC terminal 44.

In the embodiment shown in FIG. 2 the switching element 40 of each of the first and second limb portions 34a,34b is connected to the AC terminal 44 and the chain-link converter 42 of each of the first and second limb portions 34a,34b is connected to the respective DC terminal 36,38.

The series connection between the switching element 40 and the chain-link converter 42 of each of the first and second limb portions 34a,34b means that, in other embodiments, they may be connected in a reverse order between the AC terminal 44 and the respective DC terminal 36,38.

The AC terminal 44 is connected to a transformer 32. In other embodiments the AC terminal 44 may be connected to one or more additional transformers and/or one or more inductors.

The first DC terminal 36 is connected to a positive terminal 46 of a DC network 22 which carries a voltage of $+V_{DC}/2$, where $V_{DC}$ is the DC voltage range of the DC network 22. The second DC terminal 38 is connected to a negative terminal 48 of a DC network 22 which carries a voltage of $-V_{DC}/2$.

A pair of DC side capacitors 50a,50b are connected in series between the first and second DC terminals 36,38, a connection to ground 52 being provided at the junction between the DC side capacitors 50a,50b. The connection to ground 52 ensures that there is zero net DC voltage across the transformer 32 connected to the AC terminal 44.

In other embodiments, it is envisaged that the connection to ground 52 may be moved to a neutral (star) point of the transformer 32 connected to the AC terminal 44.

Figure 3:
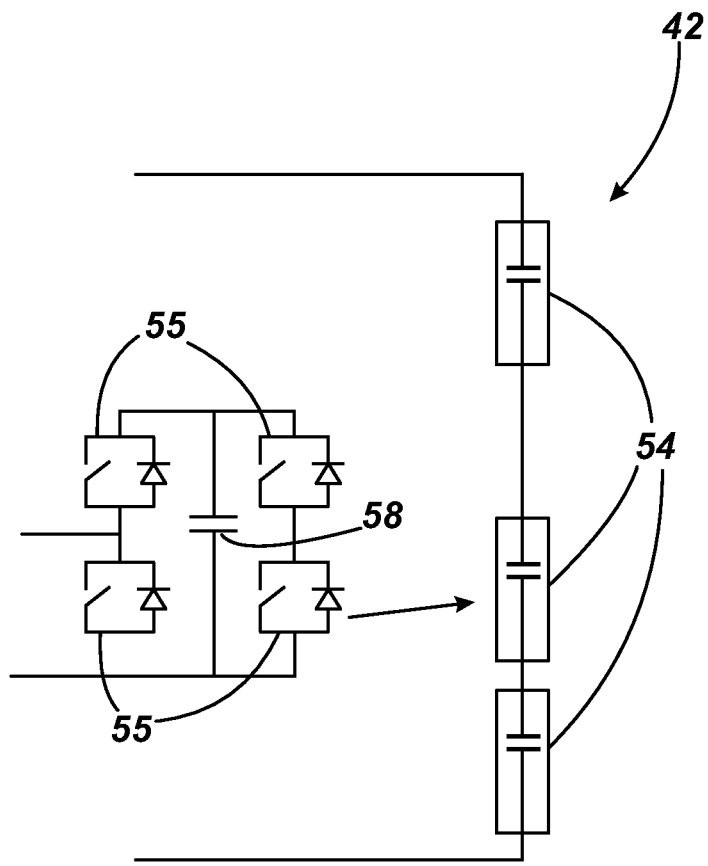
FIG. 3 shows the structure of a chain-link converter of the voltage source converter of FIG. 2.

Referring to FIG. 3, the chain-link converter 42 of each of the first and second limb portions 34a,34b includes a chain of modules 54 connected in series, each module 54 including two pairs of secondary switching elements 55 connected in parallel with a capacitor 58 in a full-bridge arrangement to form a 4-quadrant bipolar module that can provide positive, zero or negative voltage, and can conduct current in both directions.

The secondary switching elements 55 are operable so that the chain of modules 54 provides a stepped variable voltage source, and are switched at the fundamental frequency of the AC network 20.

It is envisaged that in other embodiments, the capacitor 58 of each of the modules 54 may be replaced by a different energy storage device such as a fuel cell, a battery or an auxiliary AC generator with an associated rectifier.

The capacitor 58 of each module 54 may be bypassed or inserted into the respective chain-link converter 42 by changing the state of the secondary switching elements 55.

A capacitor 58 of a module 54 is bypassed when a pair of secondary switching elements 55 is configured to form a short circuit in the module 54, causing the current in the voltage source converter to pass through the short circuit and bypass the capacitor 58.

A capacitor 58 of a module 54 is inserted into the chain-link converter 42 when the pair of secondary switching elements 55 is configured to allow the converter current to flow into and out of the capacitor 58, which is then able to charge or to discharge its stored energy and provide a voltage.

It is therefore possible to build up a combined voltage across the chain-link converter 42 which is higher than the voltage available from each of individual modules via the insertion of the capacitors 58 of multiple modules 54, each providing its own voltage, into the chain-link converter 42.

Figure 4:
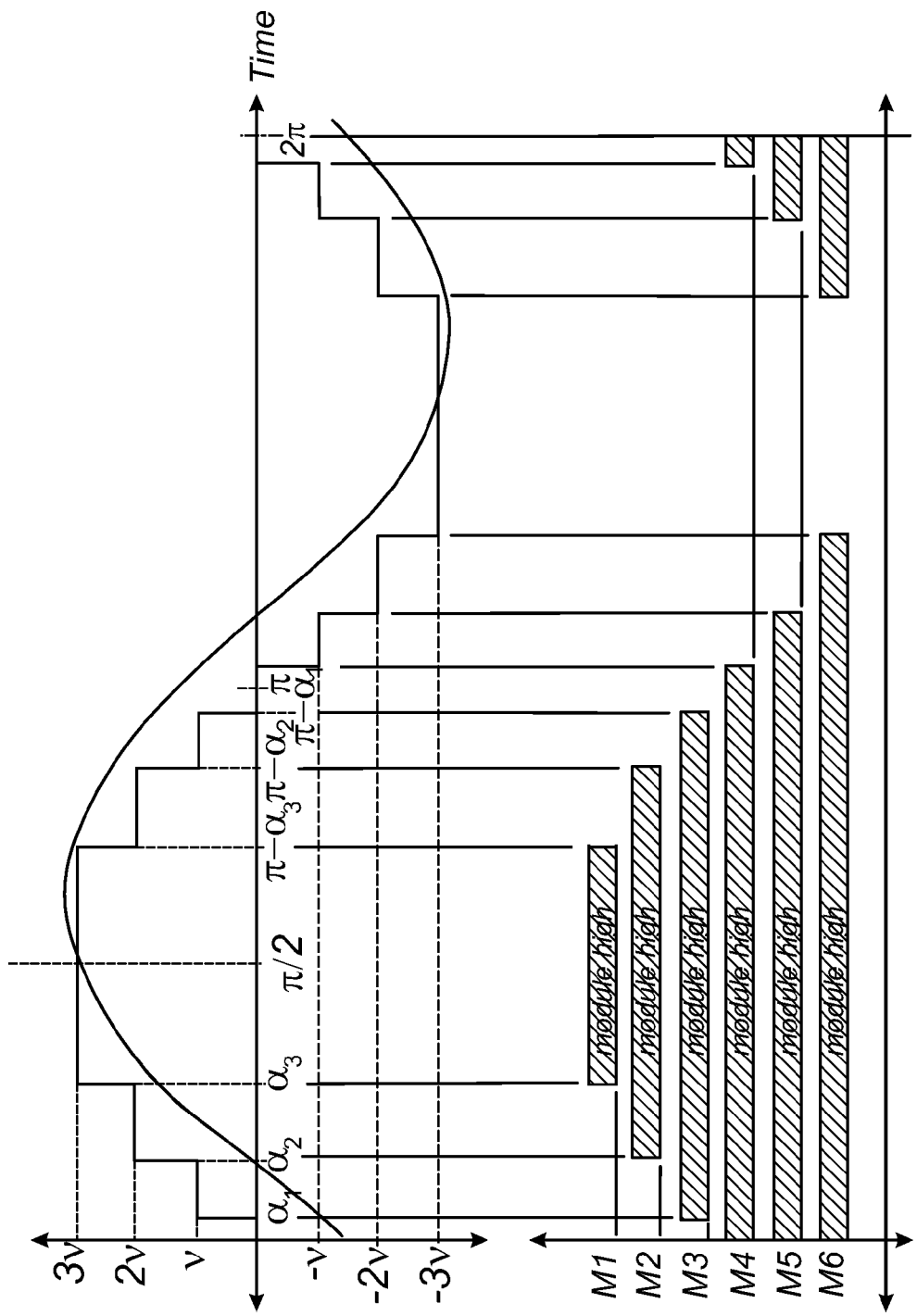
FIG. 4 shows the synthesis of a 50 Hz waveform using the chain-link converter shown in FIG. 3.

It is also possible to vary the timing of switching operations for each module 54 such that the insertion and/or bypass of the capacitors 58 of individual modules 54 in the chain-link converter 42 results in the generation of a voltage waveform. An example of a voltage waveform generated using the chain-link converter 42 is shown in FIG. 4, in which the insertion of the capacitors 58 of the individual modules 54 is staggered to generate a 50 Hz sinusoidal waveform. Other waveform shapes may be generated by adjusting the timing of switching operations for each module 54 in the chain-link converter 42.

In the embodiment shown in FIG. 3, each secondary switching element 55 includes an insulated gate bipolar transistor accompanied by a reverse-parallel connected diode.

In other embodiments it is envisaged that each secondary switching element 55 may include a different semiconductor switch, such as a gate turn-off thyristor or an integrated gate-commutated thyristor, accompanied by a reverse-parallel connected diode.

Figure 5:
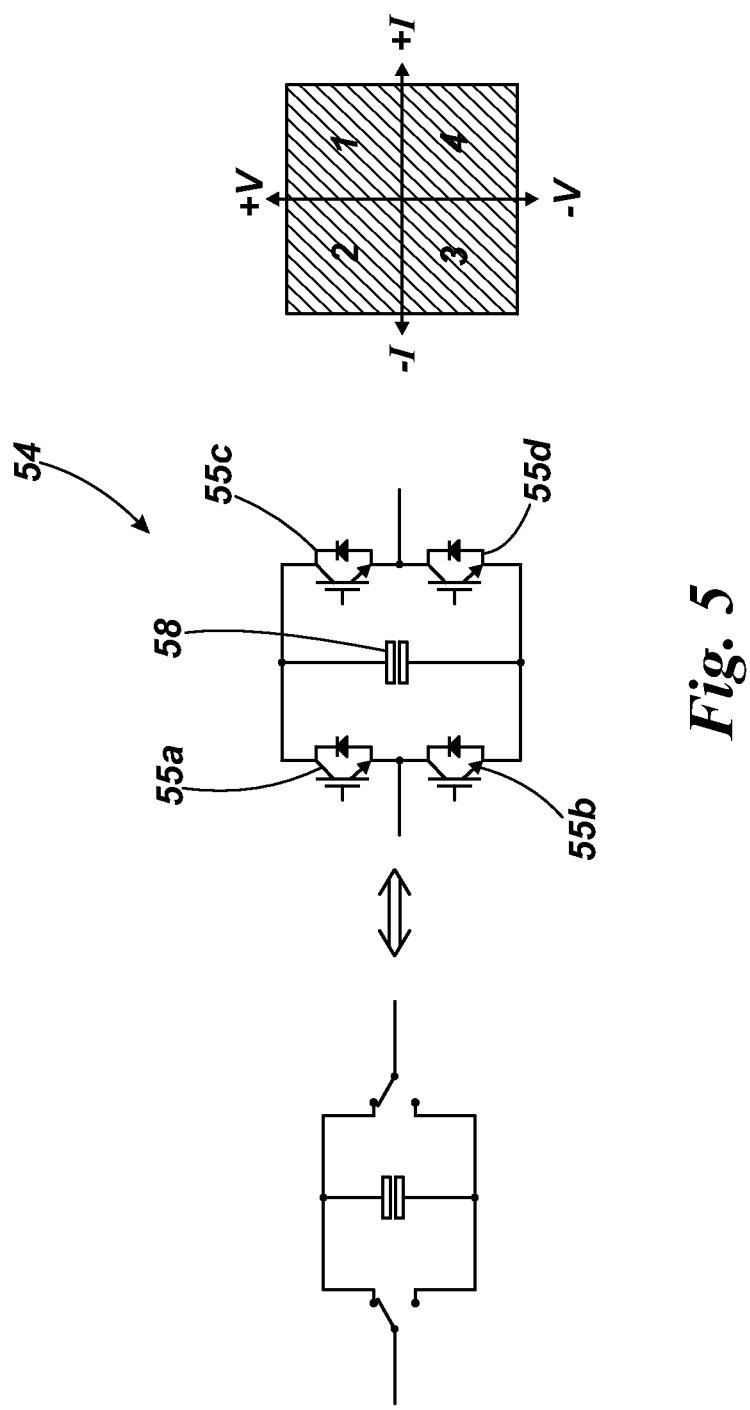
FIG. 5 shows a full-bridge module of the chain-link converter shown in FIG. 3.

The state of the secondary switching elements 55a,55b, 55c,55d (FIG. 5) of each module 54 determine the path of current through the module 54 and therefore the voltage provided by the module 54.

More specifically, the module 54 provides zero voltage when the capacitor 58 is bypassed by either closing secondary switching element 55a and 55c, or closing secondary switching elements 55b and 55d.

The module 54 provides positive voltage for both directions of current flow when secondary switching elements 55a and 55d are closed and secondary switching elements 55b and 55c are open so that current flows via secondary switching elements 55a and 55d into and out of the capacitor 58.

The module 54 provides negative voltage for both directions of current flow when switches 55b and 55c are closed and switches 55a and 55d are open so that current flows via switches 55b and 55c into and out of the capacitor 58.

The number of modules 54 in each chain-link converter 42 is determined by the required voltage rating of the voltage source converter 37.

In use the switching elements 40 and the chain-link converters 42 of the first and second limb portions 34a,34b are operable to switch each of the chain-link converters 42 in and out of circuit between the respective DC terminal 36,38 and the AC terminal 44. The chain-link converters 42 are operable to generate a voltage waveform at the AC terminal 44.

The chain-link converters 42 are preferably operable to generate a sinusoidal voltage waveform using a step-wise approximation. The chain-link converters 42 are suitable for use in step-wise waveform generation due to their ability to provide voltage steps to increase or decrease the output voltage at the AC terminal 44.

Figure 6:
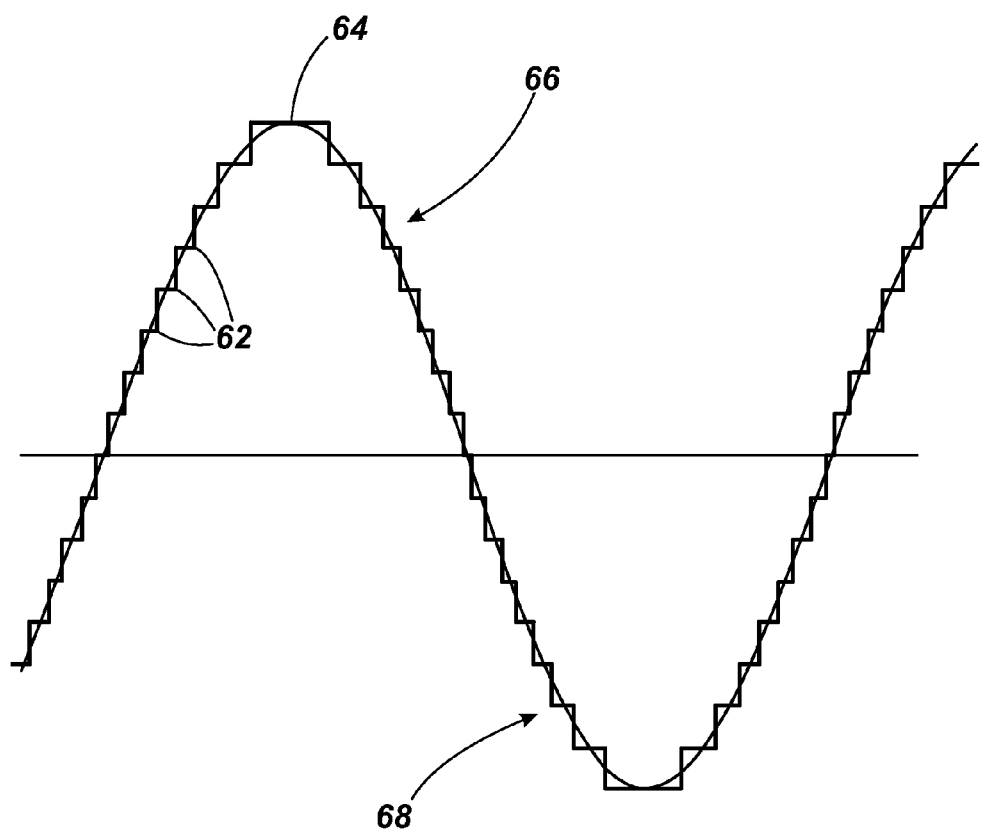
FIG. 6 shows the generation of a sinusoidal voltage waveform at the AC phase connection terminal of the voltage source converter shown in FIG. 1.

As previously described, the switching operations in the chain-link modules 54 may be configured so that the insertion and bypass of the capacitors 58 are staggered to form a step-wise approximation of a sinusoidal waveform, as shown in FIG. 4. The step-wise approximation of the voltage waveform may be improved by using a higher number of modules 54 with lower voltage levels to increase the number of voltage steps 62, as shown in FIG. 6.

The switching element 40 of the first limb portion 34a is closed while the switching element 40 of the second limb portion 34b is open. The chain-link converter 42 in the first limb portion 34a is controlled to provide a voltage of $+V_{DC}/2$ so that it opposes the voltage at the positive terminal 46 of the DC network 22. The output voltage at the AC phase connection terminal 44 is therefore zero volts i.e. halfway between the positive DC voltage at the positive terminal 46, $+V_{DC}/2$, and the negative DC voltage at the negative terminal 48, $-V_{DC}/2$. Any unused chain-link modules 54 are left in bypass mode.

In order to generate the positive voltage component 66 of the sinusoidal voltage waveform, the output voltage is slowly increased by reducing the number of inserted capacitors 58 of modules 54 in the chain-link converter 42 and thereby reducing the chain-link converter voltage. The change in the chain-link converter voltage can be observed in the step-wise increments of the output voltage at the AC terminal 44. At the peak 64 of the positive voltage component 66, the chain-link converter 42 may be bypassed to produce a peak value equal to the positive DC voltage 46, $+V_{DC}/2$, or it may produce a voltage that adds to the positive DC voltage 46 of the DC network 22. The positive voltage component 66 produced may therefore have a peak 64 that is higher than the positive DC voltage 46 of the DC network 22, if desired.

During the generation of the positive voltage component 66 of the sinusoidal voltage waveform, the voltage across the second limb portion 34b is equal to the difference between the output voltage and the negative DC voltage at the negative terminal 48, $-V_{DC}/2$ of the DC network 22.

The chain-link converter 42 of the first limb portion 34a is then controlled to reduce the output voltage in step-wise decrements by controlling the combined voltage across the chain-link converter 42 until the output voltage returns to zero.

When the output voltage returns to zero, the switching element 40 in the first limb portion 34a can remain closed when the switching element 40 of the second limb portion 34b is closed and before the switching element 40 in the first limb portion 34a is opened. This temporary over-lap period provides a method of connecting a number of modules 54 directly in parallel with the DC network 22 and provides a convenient method of resetting any drift in the capacitor 58 voltage level.

The full voltage range of the DC network 22, $V_{DC}$, is opposed by the voltage provided by the chain-link converters 42 in both limb portions 34a,34b during the switching operations of both switching elements 40a,40b from one state to the other.

The chain-link converter 42 in the first limb portion 34a is controlled to provide a voltage of $+V_{DC}/2$ while the chain-link converter 42 in the second limb portion 34b is controlled to provide a voltage of $-V_{DC}/2$. As a result, there is zero or minimal voltage across the switching elements 40 of the first and second limb portions 34a,34b when the switching elements 40 switch from one state to the other. The low voltage across the switching elements 40 of each of the limb portions 34a,34b leads to low switching losses.

The generation of the negative voltage component 68 of the sinusoidal waveform is similar to the generation of the positive voltage component 66 except that the switching element 40 of the first limb portion 34a remains open and the second switching element 40b remains closed, and the generation of the voltage waveform is caused by the insertion and bypass of modules 54 in the chain-link converter 42 of the second limb portion 34b.

During generation of the negative voltage component 68 of the sinusoidal voltage waveform, the voltage across the first limb portion 34a is equal to the difference between the output voltage and the positive DC voltage at the positive terminal 46, $+V_{DC}/2$ of the DC network 22.

When a switching element 40 in a limb portion 34a,34b is in the open state, the voltage rating of the switching element 40 is the difference between the peak output voltage 64 at the AC terminal 44 and the maximum voltage capability of the chain-link converter 42 of the same limb portion 34a,34b. For example, when the peak output voltage 64 is $+V_{DC}/2$, the voltage across the switching element 40 and the chain-link converter 42 of the second limb portion 34b is equal to $V_{DC}$, which is the difference between the peak output voltage 64 and the negative DC voltage at the negative terminal 48 of the DC network 22. The second limb portion 34b must therefore have a voltage capability that can support a voltage level of $V_{DC}$ of higher if the peak output voltage 64 exceeds the DC voltage of the DC network 22.

The voltage capability of each limb portion 34a,34b is a combination of the voltage capability of the respective chain-link converter 42 and the voltage rating of the respective switching element 40 and can be distributed in a non-symmetrical manner if desired.

The voltage capability of each chain-link converter 42 is maximised by increasing the number of chain-link modules 54 or increasing the voltage of each of the individual capacitors 58 and semiconductor switching elements 55a,55b,55c,55d. Consequently the required voltage rating of the switching element 40 may be reduced if the voltage capability of the chain-link converter 42 approaches $V_{DC}$. Reduction of voltage rating of the switching element 40 is advantageous in some applications because it allows the use of a switching element 40 that can withstand a voltage lower or much lower than the AC network 20 and/or the DC network 22.

It is also envisaged however that switching elements 40 with higher voltage ratings may be used in each limb portion 34a,34b so that the required voltage capability of the chain-link converter 42 in each limb portion 34a,34b can be reduced. This means that the number of modules 54 in each of the chain-link converters 42 may be decreased, which leads to considerable reduction in the size and weight of the voltage source converter 37.

In embodiments of the invention, the secondary switching elements 55 of the full-bridge module 56 may be configured to provide a voltage in the opposite direction so that the output voltage at the AC phase connection terminal 44 exceeds the voltage levels at the positive and negative terminals 46,48 of the DC network 22. This results in a greater power output for a given current rating of the voltage source converter 37.

The ability of the full-bridge module 54 to provide positive or negative voltage means that the voltage across each of the chain-link converters 42 may be built up from a combination of modules 54 providing positive or negative voltage instead of just positive voltage. The voltage levels in the individual capacitors 58 can therefore be maintained at optimal levels by controlling the modules 54 to alternate between providing positive voltage or negative voltage.

In the event of a fault in one electrical network resulting in high fault current in the voltage source converter 37, the secondary switching elements 55 of each module 54 of one or other of the chain-link converters 42 may be operated to insert the full-bridge modules 54 to provide a voltage which opposes the driving voltage of the other non-faulty electrical network and thereby reduces the fault current in the voltage source converter 37.

For example, a short circuit occurring across the DC side capacitors 50a, 50b connected to the DC network 22 results in both voltages at the positive and negative terminals 46,48 dropping to zero volts. When this happens, a high fault current can flow from the AC network 20 through the first limb portion 34a of the converter limb 34, and return to the AC network 20 through the short circuit and the second limb portion 34b of the converter limb 34.

The low impedance of the short circuit means that the fault current flowing in the voltage source converter 37 may exceed the current rating of the voltage source converter 37.

The fault current may be minimised by opposing the driving voltage from the AC network 20. This is carried out by configuring the secondary switching elements 55 of each chain-link module 54 such that the modules 54 are inserted into the respective chain-link converter 42 to provide a voltage which opposes and thereby reduces the driving voltage.

In embodiments in which full-bridge modules 54 are used in each chain-link converter 42, each module 54 is capable of providing a voltage to oppose an AC driving voltage because the module 54 is able to provide positive or negative voltage, and is able to conduct current in both directions.

The voltage source converter 37 shown in FIG. 2 is suitable for connection to a single phase AC network.

Figure 7:
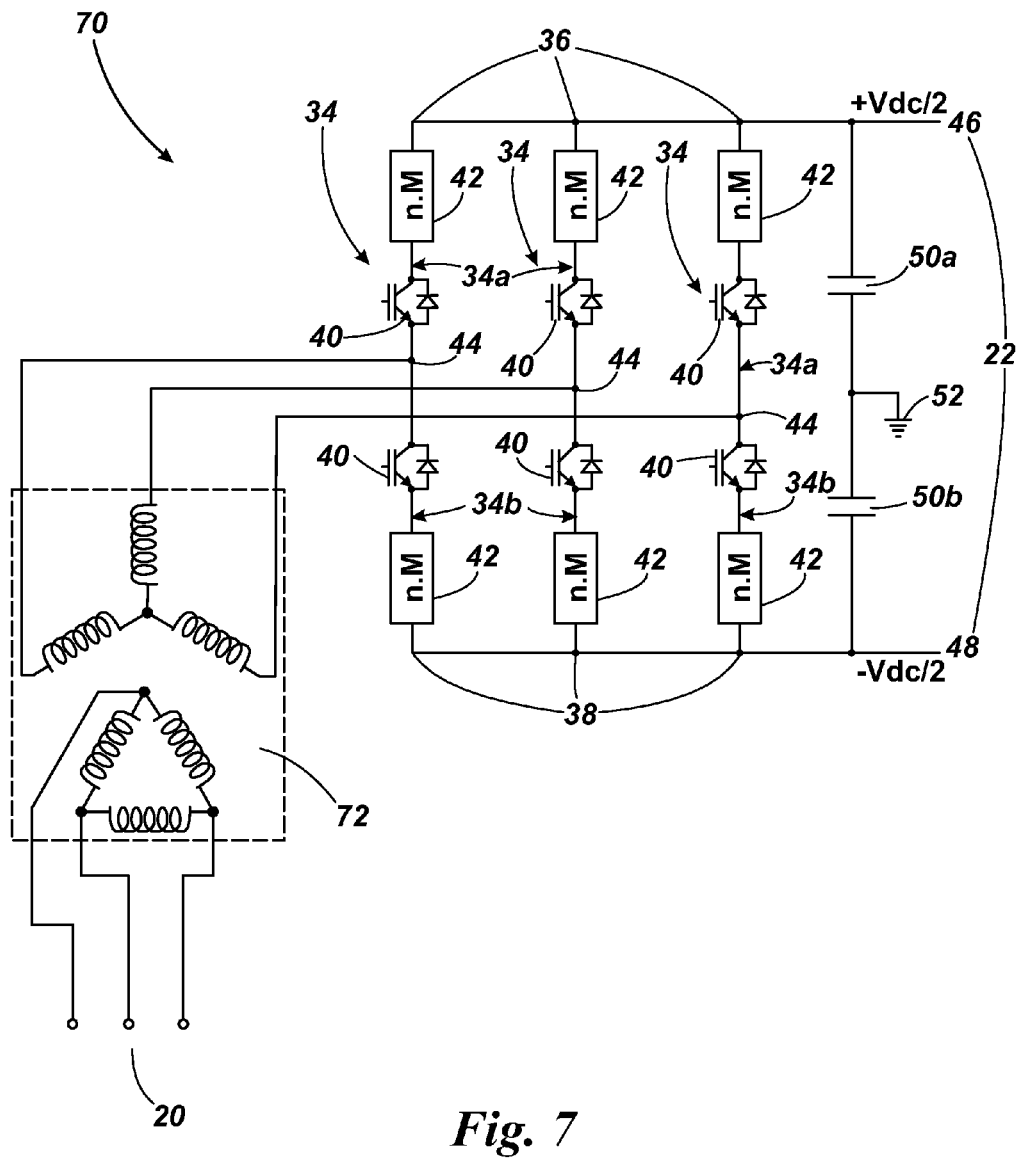
FIG. 7 shows a voltage source converter according to a second embodiment of the invention.

In other embodiments, such as that shown in FIG. 7, the voltage source converter 70 may include multiple converter limbs 34, each converter limb 34 including an AC terminal 44 for connection to an individual phase of a multiphase AC network 20. In such embodiments, the number of converter limbs 34 provided is dependent on the number of phases of the AC network 20.

The voltage source converter 70 shown in FIG. 7 includes three converter limbs 34 so as to permit use of the voltage source converter 70 with a three-phase AC network 20.

Each converter limb 34 includes first and second DC terminals 36,38 and an AC terminal 44. Each converter limb 34 also defines first and second limb portions 34a,34b, each limb portion including a switching element 40 connected in series with a chain-link converter 42 between a respective one of the first and second DC terminals 36,38 and the AC terminal 44.

The switching element 40 of each of the first and second limb portions 34a,34b is connected to the AC terminal 44 and the chain-link converter 42 of each of the first and second limb portions 34a,34b is connected to the respective DC terminal 36,38.

In use, the terminals 36,38 of each converter limb 34 are connected to the DC network 22 such that the voltage at the first DC terminal 36 of each converter limb 34 is $+V_{DC}/2$ and the voltage at the second DC terminal 38 of each converter limb 34 is $-V_{DC}/2$.

Each AC terminal 44 is connected to a phase of the multi-phase AC network 20 via a transformer 72 such that the AC terminals 44 are connected to respective phases of the AC network 20.

The switching elements 40 of the first and second limb portions 34a,34b of each converter limb 34 are operable in use to switch the respective chain-link converters 42 in and out of circuit between the respective DC terminal and the AC terminal. The chain-link converters 42 of each converter limb 34 are operable to generate a voltage waveform at the respective AC terminal 44 so that a three-phase voltage waveform is generated.

Control of the three-phase voltage source converter is similar to the above-described control of the single-phase voltage source converter 37 since operation of the series combination of the switching element 40 and the chain-link converter 42 in a converter limb 34 only affects the phase connected to that converter limb 34, and does not affect the phases connected to the other converter limbs 34.

The invention claimed is:

1. A voltage source converter for use in high voltage DC power transmission and reactive power compensation, the voltage source converter comprising at least one converter limb including first and second DC terminals for connection in use to a DC network and an AC terminal for connection in use to an AC network, the or each converter limb defining first and second limb portions, each limb portion including at least one switching element and in addition a chain link-converter, said at least one switching element being connected in series with said chain-link converter between a respective one of the first and second DC terminals and the AC terminal, the switching elements of the first and second limb portions being operable to switch the respective chain-link converters in and out of circuit between the respective DC terminal and the AC terminal and the chain-link converters being operable to generate a voltage waveform at the AC terminal.

2. A voltage source converter according to claim 1, wherein each chain-link converter is operable when the respective limb portion is switched out of circuit to generate a voltage to offset the voltage across the limb portion and thereby minimize the voltage across the respective switching element.

3. A voltage source converter according to claim 1, wherein the chain-link converter of each of the limb portions includes a chain of modules connected in series, each module including at least one pair of secondary switching elements connected in parallel with an energy storage device, the secondary switching elements being operable in use so that the chain of modules defines a stepped variable voltage source.

4. A voltage source converter according to claim 3, wherein the or each module of the chain-link converters includes two pairs of secondary switching elements connected in parallel with the respective energy storage device in a full-bridge arrangement to define a 4-quadrant bipolar module that can provide positive or negative voltage and can conduct current in both directions.

5. A voltage source converter according to claim 3, wherein the or each energy storage device includes a capacitor, a fuel cell, a battery or an auxiliary AC generator with an associated rectifier.

6. A voltage source converter according to claim 1, wherein the or each switching element of each limb portion includes a semiconductor device.

7. A voltage source converter according to claim 1, wherein the chain-link converter of each limb portion includes at least one semiconductor device.

8. A voltage source converter according to claim 6, wherein the or each semiconductor device includes an insulated gate bipolar transistor, a gate turn-off thyristor or an integrated gate-commutated thyristor.

9. A voltage source converter according to claim 1, including multiple converter limbs, each limb including an AC terminal for connection in use to a respective phase of a multi-phase AC network.

10. A voltage source converter according to claim 1, wherein the chain-link converter of each limb portion is operable to generate a voltage to oppose the flow of current created by a fault, in use, in the AC or DC networks.

11. A voltage source converter according to claim 1, wherein, in each limb portion, the voltage rating of the chain-link converter and the voltage rating of the or each switching element are equal.

12. A voltage source converter according to claim 1, wherein, in each limb portion, the voltage rating of the chain-link converter and the voltage rating of the or each switching element are not equal.

13. A voltage source converter according to claim 1, wherein the switching elements in the first and second limb portions are operable to switch the chain-link converters into circuit at the same time to reset any drift in voltages in the chain-link converter elements.

* * * * *

UNITED STATES PATENT AND TRADEMARK OFFICE
CERTIFICATE OF CORRECTION

PATENT NO. : 8,599,591 B2
APPLICATION NO. : 13/380500
DATED : December 3, 2013
INVENTOR(S) : Crookes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 109 days.

Signed and Sealed this
Twenty-second Day of September, 2015

Michelle K. Lee
*Director of the United States Patent and Trademark Office*